(12) United States Patent
Zheng et al.

(10) Patent No.: US 12,316,717 B2
(45) Date of Patent: May 27, 2025

(54) RESOURCE PREHEATING METHOD, SYSTEM, APPARATUS AND MEDIUM BASED ON CONTENT DELIVERY NETWORK

(71) Applicant: Beijing Volcano Engine Technology Co., Ltd., Beijing (CN)

(72) Inventors: Yousheng Zheng, Beijing (CN); Hanghang Zhang, Beijing (CN); Huawei Liu, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/783,333

(22) Filed: Jul. 24, 2024

(65) Prior Publication Data
US 2025/0039276 A1    Jan. 30, 2025

(51) Int. Cl.
*H04L 67/568* (2022.01)
*H04L 61/4511* (2022.01)
*H04L 61/5007* (2022.01)

(52) U.S. Cl.
CPC ........ *H04L 67/568* (2022.05); *H04L 61/4511* (2022.05); *H04L 61/5007* (2022.05)

(58) Field of Classification Search
CPC . H04L 67/568; H04L 61/5007; H04L 61/4511
(Continued)

(56) References Cited

U.S. PATENT DOCUMENTS

| 2014/0207912 A1 | 7/2014 | Thibeault et al. |
| 2021/0092088 A1 | 3/2021 | Ramachandran et al. |

(Continued)

FOREIGN PATENT DOCUMENTS

| CN | 110661862 A | 1/2020 |
| CN | 110677484 A | 1/2020 |

(Continued)

OTHER PUBLICATIONS

Ctera, Managing Local Deduplication, Sep. 21, 2023, kb.ctera.com, https://web.archive.org/web/20230930194528/https://kb.ctera.com/docs/managing-local-deduplication (Year: 2023).*

(Continued)

*Primary Examiner* — Zi Ye
(74) *Attorney, Agent, or Firm* — BakerHostetler

(57) ABSTRACT

The present disclosure discloses a resource preheating method, system, apparatus and medium based on a content delivery network, wherein the content delivery network comprises a plurality of edge nodes for resource caching; the method comprises: creating an IP acquisition request based on a domain name that requires resource preheating and a first IP address of a client in a preheating area, so as to acquire a second IP address of a first edge node that the client needs to connect to; sending an access request to the first edge node to determine whether the first edge node has cached resources under the domain name according to the second IP address; and in response that the first edge node has not cached the resources under the domain name, preheating the resources under the domain name at the first edge node.

17 Claims, 3 Drawing Sheets

(58) Field of Classification Search
USPC .......................................................... 709/203
See application file for complete search history.

(56) References Cited

U.S. PATENT DOCUMENTS

2021/0289040 A1* 9/2021 Arsenault ........... H04L 67/5681
2022/0329672 A1* 10/2022 LV ......................... H04L 67/60

FOREIGN PATENT DOCUMENTS

| CN | 111355731 A | 6/2020 |
| CN | 111131515 B | 7/2022 |
| CN | 114760487 A | 7/2022 |
| CN | 115190120 A | 10/2022 |
| CN | 115250368 A | 10/2022 |
| CN | 116846868 A | 10/2023 |

OTHER PUBLICATIONS

Huosanyun, What is CDN Refresh and Preheat?, Mar. 27, 2023, https://www.huosanyun.com/en/6221/ (Year: 2023).*

"CDN pre-fetch function_Learning Notes"; https://developer.aliyun.com/article/1069362; Aliyun.com; Nov. 2022; accessed Jul. 19, 2024; 9 pages.

"EDNS"; https://www.jianshu.com/p/5be49c2c7863; Jun. 2019; accessed Jul. 19, 2024; 5 pages.

"Ip list"; https://wenku.baidu.com/view/f0eb7835f76527d3240c844769eae009581ba219.html ?_wkts=1721396995906&bdQuery=%E5%90%84%E5%98%BD+IP+%E7%BD%91%E6%AE%B5; accessed Jul. 19, 2024; 53 pages.

"X-Cache Title Description"; https://www.orcode.com/question/715148_kde61d.html; OrCode.com; May 2019; accessed Jul. 19, 2024; 2 pages.

"About cache Akamai cache refresh"; https://www.codenong.com/351511/; accessed Jul. 19, 2024; 2 pages.

Philip Walton; "Custom metrics"; https://web.dev/articles/custom-metrics#server-timing-api; Mar. 2024; accessed Jul. 19, 2024; 13 pages.

"Metowolf/iplist'"; https://github.com/metowolf/iplist?tab=readme-oy-file; Github; Jul. 2024; accessed Jul. 19, 2024; 3 pages.

China Publication No. 111131515B Published Jul. 15, 2022; Wuhan Fengshiwei Technology Co. Ltd; 3 pages.

International Patent Application No. PCT/CN2024/105089; Int'l Written Opinion and Search Report; dated Sep. 23, 2024; 7 pages.

European Patent Application No. 24188641.5; Extended Search Report; dated Oct. 23, 2024; 10 pages.

Cohen et al.; "Prefetching the means for document transfer: a new approach for reducing Web latency"; Computer Networks; vol. 39; 2002; p. 437-455.

"Hierarchical Caching"; https://web.archive.org/web/20230521060048/https://docs.trafficserver.apache.org/en/latest/admin-guide/configuration/hierarchical-caching.en.html; May 2023; accessed Dec. 17, 2024; 4 pages.

* cited by examiner

RESOURCE PREHEATING METHOD, SYSTEM, APPARATUS AND MEDIUM BASED ON CONTENT DELIVERY NETWORK

CROSS-REFERENCE TO RELATED APPLICATION

This application claims priority to Chinese Patent Application No 202310926857.5, filed on Jul. 26, 2023, which is hereby incorporated by reference in its entirety.

TECHNICAL FIELD

The present disclosure relates to the technical field of Internet, in particular to a resource preheating method, system, apparatus and medium based on a content delivery network.

BACKGROUND ART

Content Delivery Network (CDN) enables users to access resources from the nearest edge nodes by deploying edge nodes in various regions, which improves the response speed of resource access. In particular, when a user requests to access target resources through a client, if the edge node has cached the target resources, the edge node directly returns the locally cached target resources to the client; if the edge node has not cached the target resources, the edge node obtains the target resources from a source station, then returns the obtained target resources to the client and caches the target resources locally. As so, when the client requests to access the target resources next time, the edge node can directly obtain the target resources from the local cache without obtaining the target resources from the source station. Resource preheating means pushing resources from a source station to an edge node in advance for caching. As so, when the client requests to access resources, the edge node can directly obtain resources from the local cache without obtaining resources from the source station, which improves the response speed of resource access and relieves the pressure of the source station.

At present, when implementing resource preheating, there is a problem that preheating fails in some edge nodes. Simply put, the resources that need to be preheated are not cached in some edge nodes, and the accuracy of resource preheating needs to be improved.

SUMMARY OF THE INVENTION

In view of this, embodiments of the present disclosure provide a resource preheating method, a resource preheating system, an electronic apparatus and a non-transitory computer-readable storage medium, which can improve the accuracy of resource preheating.

On one aspect, the present disclosure provides a resource preheating method based on a content delivery network, wherein the content delivery network comprises a plurality of edge nodes for resource caching; the method comprises:
creating an IP acquisition request based on a domain name that requires resource preheating and a first IP address of a client in a preheating area, so as to acquire a second IP address of a first edge node that the client needs to connect to;
sending an access request to the first edge node to determine whether the first edge node has cached resources under the domain name according to the second IP address; and
in response that the first edge node has not cached the resources under the domain name, preheating the resources under the domain name at the first edge node.

On another aspect, the present disclosure provides a non-transitory computer-readable storage medium having a computer program stored thereon, wherein the computer program when executed by a processor causes the processor to implement said method as mentioned above.

On a further aspect, the present disclosure provides an electronic apparatus comprising a processor and a memory configured for storing a computer program, wherein the computer program when executed by the processor causes the processor to implement said method as mentioned above.

In a technical solution of some embodiments of the present disclosure, by creating an IP acquisition request based on a domain name that needs resource preheating and a first IP address of a client in a preheating area, acquiring a second IP address of a first edge node that the client needs to connect, and sending an access request to the first edge node based on the second IP address to determine whether the first edge node caches resources under the domain name. If not, preheating the resources under the domain name at the first edge node again.

BRIEF DESCRIPTION OF THE DRAWINGS

Features and advantages of the present disclosure will be more clearly understood by referring to the attached drawings, which are schematic and should not be construed as limiting the present disclosure in any way, in which.

DETAILED DESCRIPTION OF PREFERRED EMBODIMENTS

In order to make the objectives, technical solutions and advantages of the embodiments of the present disclosure more clear, with reference to the drawings of the embodiments of the present disclosure, a clear and complete description is given below for the technical solutions of the embodiments of the present disclosure. Obviously, the embodiments described below are only part of the embodiments, rather than all of the embodiments. All the other embodiments that can be obtained by a person skilled in the art based on the embodiments of the present disclosure without any creative effort are included in the protection scope of the present disclosure.

Figure 1:
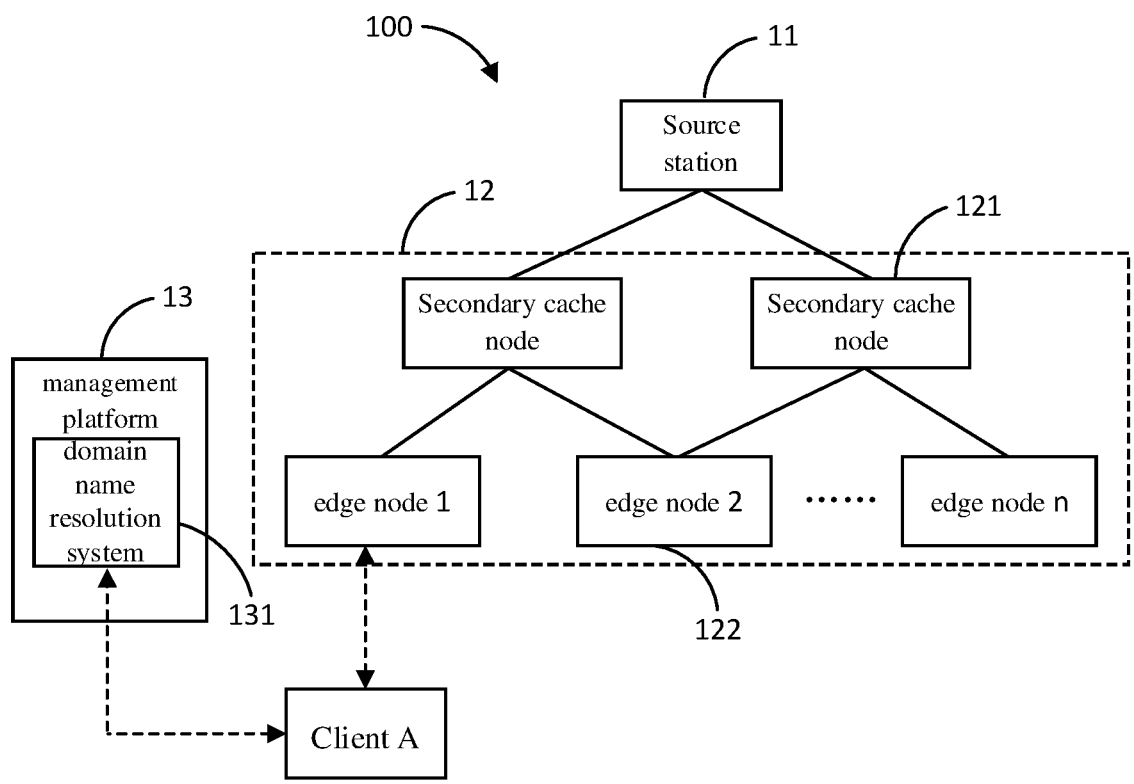
FIG. 1 shows a schematic architecture diagram of a content delivery network provided by embodiments of the present disclosure.

Referring now to FIG. 1, there is shown a schematic architecture diagram of a content delivery network 100 provided by embodiments of the present disclosure. In FIG. 1, the content delivery network 100 comprises a source station 11, a cache system 12, and a management platform 13 for managing the content delivery network 100. Wherein:

The source station 11 may comprise a server device providing resources. Resources can refer to information content recorded in digital form, stored in computer storage media and allowed to be transmitted through computer network communication, such as images, sounds, text and so on.

The caching system 12 can cache at least part of the resources in the source station 11. In this embodiment, the caching system 12 includes a plurality of edge nodes 122 for resource caching and a secondary cache node 121 connected with the edge nodes 122. The edge node 122 is communicatively connected with the source station 11 through the secondary cache node 121. One or more edge nodes 122 may be connected to a single secondary cache node 121, and the single edge node 122 may be connected to different secondary cache nodes 121. In some other embodiments, the cache system 12 may include other level cache nodes except the edge nodes 122 and the secondary cache node 121. For example, between the secondary cache node 121 and the source station 11, the cache system 12 may further include a tertiary cache node.

Different edge nodes 122 may be deployed in different geographical areas. Clients in individual geographical areas can access the resources in the source station 11 by visiting the nearest edge nodes 122 in their geographical areas or adjacent geographical areas.

In particular, the management platform 13 may include a domain name resolution system 131. When a client accesses resources based on a domain name, it can establish a connection with the domain name resolution system 131. The domain name resolution system 131 determines the geographical area where the client is located according to the IP address of the client, resolves the domain name, and returns an IP address of a target edge node 122 (such as the edge node 1 in FIG. 1) which is close to the client to the client. The client initiates a resource access request to the target edge node 122 based on the IP address returned by the domain name resolution system 131. In response to the resource access request initiated by the client, the target edge node 122 checks whether the resources to be accessed by the client have been cached locally, and if so, directly returns the locally cached resources to the client; if not, checks whether the resources to be accessed by the client are cached in the connected secondary caching node 121. If the secondary cache node 121 has cached the resources to be accessed by the client, the target edge node 122 obtains the resources from the secondary cache node 121, and returns the obtained resources to the client and caches the obtained resources locally. As so, the next time the client initiates an access request for the same resources, the target edge node 122 can directly obtain the resources from the local cache, thus improving the response speed of resource access.

When neither the target edge node 122 nor the secondary cache node 121 connected to the target edge node 122 caches the resources to be accessed by the client, the target edge node 122 can obtain the resources from the source station 11, return the obtained resources to the client, and locally cache the obtained resources. This process can also be called "resource returning".

The so-called resource preheating means pushing the resources of the source station 11 to the edge nodes 122 for caching in advance. In this way, the pressure of the source station 11 can be relieved. For example, after preheating the resources under a certain domain name at the edge node 122, when a client accesses the resources under this domain name, the edge node 122 no longer needs to obtain the resources from the source station 11, thus alleviating the pressure of the source station 11. In particular, the user can arrange the resources to be preheated and the target geographical area to be preheated on the management platform 13. Through scheduling management, the management platform 13 pushes the resources to be preheated from the source station 11 to the edge node 122 of the target geographical area for caching.

At present, when the content delivery network 100 is implementing resource preheating, some edge nodes 122 that need to have preheating may be omitted, and the accuracy of resource preheating needs to be improved.

In view of this, the present disclosure provides a resource preheating method based on a content delivery network, which can improve the accuracy of resource preheating. The resource preheating method can be applied to the management platform of the content delivery network. In order to facilitate understanding, the related concepts and general ideas in the method of the present disclosure are explained before the method of the present disclosure is elaborated in detail.

In the method according to the present disclosure, for domain names that need resource preheating, resources under these domain names need to be pushed to edge nodes for caching. Preheating area is used to represent a geographical area to implement resource preheating. For example, if the domain name that needs to have resource preheating is www.abc.com and the preheating area is Area A, then the resources under the domain name www.abc.com are pushed to the edge node of Area A for caching. In some embodiments, the pushing the resources under the domain name to the edge node in the preheating area for caching, may include the following two manners:

1) Pushing the resources under the domain name to the superior cache node connected by the edge node for caching. Wherein, the superior cache node can be a cache node located between the edge node and the source station, such as a secondary cache node and a tertiary cache node.
2) Pushing the resources of the source station to the edge node for local caching.

In the specific implementation process, resources can be preheated based on one of the above manners.

In order to ensure that the resources under the domain name are successfully preheated at the edge node, the management platform can send an access request to the edge node based on the IP address of the edge node in the preheating area to check whether the edge node caches the resources under the domain name. If the edge node has cached the resources under the domain name, it means that the resources under the domain name are successfully preheated at the edge node; if the edge node has not cached the resources under the domain name, it means that the resources under the domain name failed to be preheated at the edge node. Through the above check, the edge nodes that failed in preheating can be screened out, and the resources under the domain name can be preheated again at the edge nodes that failed in preheating, so as to ensure that the resources under the domain name can be successfully preheated at all edge nodes in the preheating area. In this way, the purpose of improving the preheating accuracy is achieved.

Figure 2:
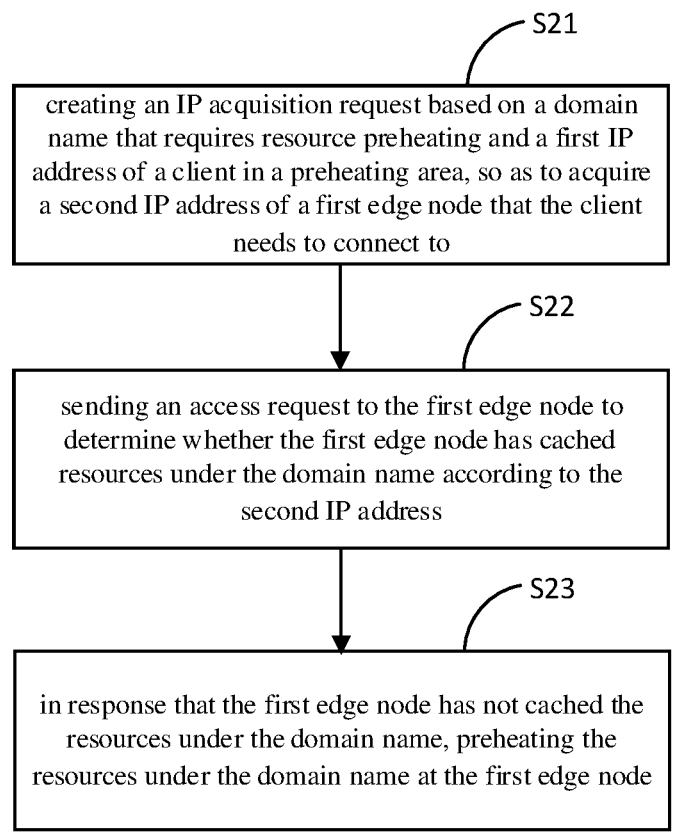
FIG. 2 shows a flow chart of a resource preheating method provided by embodiments of the present disclosure.

Based on the above description, referring now to FIG. 2, there is shown a flow chart of a resource preheating method provided by embodiments of the present disclosure. In FIG. 2, the resource preheating method comprises steps of the following:

In step S21, an IP acquisition request is created based on a domain name that requires resource preheating and a first IP address of a client in a preheating area, so as to acquire a second IP address of a first edge node that the client needs to connect to.

Simply put, step S21 is a process of obtaining the IP address of the edge node. Referring to the illustration of FIG. 1, when the client obtains the resources under the domain name, it first obtains the IP address of the edge node that needs to be connected, and then connects to the corresponding edge node for resource access. Therefore, according to the principle that the client obtains the IP address of the edge node, the IP address of the edge node can be obtained by simulating the client. In particular, an IP acquisition request can be created based on the EDNS (Extension Mechanisms for DNS), and the IP acquisition request carries the domain name that needs resource preheating and the first IP address of the client in the preheating area, and the domain name resolution system based on the IP acquisition request returns the second IP address of the first edge node that the client needs to connect (that is, the IP address of the edge node in the preheating area is obtained).

In particular, the format of the IP acquisition request can be:

https://edns.xxx.com/q?host=aaa.bbb.com&ip=1.1.1.1
  wherein, edns.xxx.com can represent the domain name of the domain name resolution system;
  aaa.bbb.com can represent the domain name that needs resource preheating;
  1.1.1.1 can represent the first IP address of the client in the preheating area.

In step S22, according to the second IP address, an access request is sent to the first edge node to determine whether the first edge node has cached resources under the domain name.

In some embodiments, that the first edge node has cached resources under the domain name, may include the following two instances:

1) The first edge node has cached the resources under the domain name locally;
2) The superior cache node connected with the first edge node has cached the resources under the domain name.

As long as either of the above instances is met, it can be determined that the first edge node has cached the resources under the domain name.

It can be understood that if the first edge node has cached the resources under the domain name, these resources can come from two sources. One source is that the resources are obtained and cached by the first edge node from the source station by resource returning based on the resource access request initiated by the client; another source is that the resources are obtained and cached by preheating. In the present disclosure, when determining whether the first edge node caches the resources under the domain name, it is mainly to determine whether the first edge node caches the resources under the domain name in advance by preheating.

In order to identify whether the first edge node has resources under the domain name cached by preheating, an access request can be sent to the first edge node based on specified resources under the domain name that have not been obtained from the first edge node. The access request is configured to request access to the specified resources. Since the client has not obtained the specified resources from the first edge node, it can be guaranteed that the specified resources have not been cached to the first edge node by resource returning. On the premise of the above, based on a response returned by the first edge node, it can be determined whether the first edge node and the superior cache node connected with the first edge node have the specified resources. If neither the first edge node nor the superior cache node connected with the first edge node has the specified resources, it can be determined that the resources under the domain name are not cached by the first edge node, and then it can be determined that the resources under the domain name failed to be preheated at the first edge node; if the first edge node or the superior cache node connected with the first edge node has the specified resources, it can be determined that the first edge node has cached the resources under the domain name, and then it can be determined that the resources under the domain name are successfully preheated at the first edge node.

It is explained below how to determine whether the first edge node and the superior cache node connected with the first edge node have the specified resources to be accessed based on the response returned by the first edge node. For example, suppose the domain name is aaa.bbb.com and the URL of the specified resources is http://aaa.bbb.com/new.txt. After sending an access request to the first edge node for the specified resources, the response returned by the first edge node may be similar to the following:

<X-Cache: TCP_MISS from a23-200-24-95.deploy.akamaitechnologies.com (AkamaiGHost/11.1.0-48603064)(-)
  <X-Cache-Remote: TCP_MISS from a23-50-232-195.deploy.akamaitechnologies.com (AkamaiGHost/11.1.0-48603064)(-)

Wherein, X-cache: TCP_MISS from a23-200-24-95: indicates that the IP address of the first edge node is 23.200.24.95, and the hit state of the first edge node to the specified resources is "TCP_miss", that is, the first edge node does not hit (cache) the specified resources.

X-cache-remote: TCP_MISS from A23-50-232-195: indicates that the IP address of the secondary cache node connected to the first edge node is 23.50.232.195, and the hit state of the secondary cache node to the specified resources is "TCP_miss", that is, the secondary cache node does not hit (cache) the specified resources.

Based on the above responses, it can be determined that the first edge node did not cache the specified resources, that is, the resources under the domain name failed to be preheated at the first edge node.

However, if in the response returned by the first edge node, the hit state of the first edge node or the superior cache node connected with the first edge node (such as the secondary cache node) to the specified resources is not "TCP_MISS", it means that the first edge node or the superior cache node connected with the first edge node hit (cached) the specified resources, and the resources under the domain name are successfully preheated at the first edge node.

For example, in the following response:

<X-Cache: TCP_MISS from a23-200-24-95.deploy.akamaitechnologies.com (AkamaiGHost/11.1.0-48603064)(-)
  <X-Cache-Remote: TCP_HIT from a23-50-232-195.deploy.akamaitechnologies.com (AkamaiGHost/11.1.0-48603064)(-)
  <Server-Timing: cdn-cache; desc=MISS, edge; dur=189

The hit state of the first edge node to the specified resources is "TCP_MISS", and the hit state of the second-level cache node connected with the first edge node to the specified resources is "TCP_HIT". Since the secondary cache node connected with the first edge node has cached the specified resources, it can be determined that the resources under the domain name are successfully preheated at the first edge node.

Whereby, it can be determined whether the resources under the domain name have been successfully cached at the first edge node.

In step S23, in response that the first edge node has not cached the resources under the domain name, preheating the resources under the domain name at the first edge node.

In particular, the resources under the domain name can be cached to the first edge node or the superior cache node connected to the first edge node. As a conventional technical means in this filed, resource preheating is not described here.

To sum up, in a technical solution of some embodiments of the present disclosure, by creating an IP acquisition request based on a domain name that needs resource preheating and a first IP address of a client in a preheating area, acquiring a second IP address of a first edge node that the client needs to connect, and sending an access request to the first edge node based on the second IP address to determine whether the first edge node caches resources under the domain name. If not, preheating the resources under the domain name at the first edge node again. As so, preheating result at the first edge node can be checked, and resources can be preheated again in case of preheating failure, so as to ensure that the first edge node can successfully cache the resources under the domain name, thereby improving the accuracy of resource preheating.

Further, since the preheating area may include a large number of edge nodes, it is described below how to check and preheat the edge nodes in the preheating area in batches.

Because the edge nodes in the preheating area are usually located in different geographical locations, and the clients visit the nearest edge nodes, the second IP addresses of the edge nodes in different geographical locations can be obtained based on the first IP addresses of the clients in various network areas in the preheating area. Network areas refer to geographical areas divided by IP network segments. It can be understood by those skilled in the art that different cities have corresponding IP network segments, respectively. Further dividing the IP network segment of each city can make different areas in the same city correspond to different network segments. Different areas of these IP network segments can be considered as network areas. Obtaining the IP addresses of clients in different IP network segments in the preheating area is equivalent to obtaining the first IP addresses of clients in various network areas in the preheating area. For example, IP addresses of clients in different IP network segments can be queried from the geo IP database.

To sum up, the creating an IP acquisition request based on a domain name that needs resource preheating and a first IP address of a client in a preheating area, may comprise:
   obtaining first IP addresses of clients in different IP network segments in the preheating area; and
   creating an IP acquisition request based on the domain name and the first IP address of each client, so as to acquire a second IP address of the first edge node that each client needs to connect.

Further, since different clients in a single network area are usually connected to a single first edge node, that is, in a single network area, the second IP address of the first edge node that is obtained, based on the first IP addresses of different clients, is the same. For a single first edge node, only one preheating result check or resource preheating is needed. Therefore, when obtaining the first IP addresses of clients in different IP network segments in the preheating area, the first IP address of one of the clients can be obtained in each IP network segment in the preheating area. As so, the amount of data processing can be reduced, and at the same time, avoiding check the preheating results or resource preheating for a single first edge node for many times.

After obtaining the second IP address of each first edge node based on the first IP addresses of clients at different IP network segments, the first IP address of the client and the second IP address of the first edge node to which the client needs to connect form a first correspondence, and based on said first correspondence, the preheating result of each first edge node can be checked. Table 1 exemplarily lists the first correspondence:

TABLE 1

| First Correspondence | |
| --- | --- |
| First IP Address of Client | Second IP Address of First Edge Node |
| 1.1.1.1 | 11.11.11.11 |
| 2.2.2.2 | 22.22.22.22 |
| 3.3.3.3 | 22.22.22.22 |
| 4.4.4.4 | 44.44.44.41 |
| 5.5.5.5 | 44.44.44.42 |

As can be seen from Table 1, in the first correspondence, there may be that first IP addresses of different clients correspond to a second IP address of a single first edge node. The reason for this situation is that clients in two network areas are connected to the same first edge node (such as 22.22.22.22) when obtaining resources under a domain name. For example, clients in city A and city B are accessing resources, and they are both connected to the first edge node of city A. In this situation, if the first edge node is checked based on the first correspondence in Table 1, the single first edge node may be repeatedly checked. In order to avoid this situation, a de-duplication operation can be made to the first correspondence. That is, if there is a plurality of first IP addresses corresponding to a single second IP address, among the first IP addresses, the correspondence of one of the first IP addresses to the second IP address is retained, and the correspondence of the other first IP addresses to the second IP address is deleted. For example, in Table 1, the correspondence of 2.2.2.2 to 22.22.22.22 can be retained, and the correspondence of 3.3.3.3 to 22.22.22.22 can be deleted. As so, when checking the preheating result of the first edge node 22.22.22.22, only one operation is needed.

Further, in some embodiments, for the first edge nodes belonging to a single IP network segment, it can be considered that the two first edge nodes belong to the same computer room, and only one of the first edge nodes can be checked for the preheating result. In view of this, the first correspondence can be further de-duplicated. That is, if there are multiple second IP addresses in a single IP network segment, among the multiple second IP addresses, the correspondence of one of the second IP addresses to the first IP address is retained, and the correspondence of the other second IP addresses to the first IP address is deleted. For example, in Table 1, in the second IP addresses of the first edge node, 44.44.44.41 and 44.44.44.42 are in a single IP network segment, so that the correspondence of 44.44.44.41 to 4.4.4.4 can be retained, and the correspondence of 44.44.44.41 to 5.5.5.5 can be deleted.

Whereby, the result shown in Table 2 can be obtained after performing the de-duplication operation on the first correspondence in Table 1.

TABLE 2

First Correspondence After De-duplication

| First IP Address of Client | Second IP Address of First Edge Node |
|---|---|
| 1.1.1.1 | 11.11.11.11 |
| 2.2.2.2 | 22.22.22.22 |
| 4.4.4.4 | 44.44.44.41 |

Further, when sending an access request to the first edge node according to the second IP address, the access request can be sent to each of the first edge nodes, based on the second IP address in the first correspondence after completion of the de-duplication operation, so as to determine whether each first edge node has cached the resources under the domain name. As so, on one hand, the amount of data processing is reduced; on the other hand, the repeated sending of access requests to a single first edge node or first edge nodes in a single computer room is prevented.

Understandably, after sending access requests to the first edge nodes based on the second IP address in the first correspondence after completion of the de-duplication operation, the first edge nodes that have not cached the resources of the domain name can be screened out according to the responses of the first edge nodes, and then the resources under the domain name can be re-preheated at these first edge nodes.

In some embodiments, the preheating resources under a domain name at first edge nodes may comprise:

for any first edge node, if this first edge node has not cached the resources under the domain name, taking this first edge node as an edge node to be preheated;

establishing a preheating coverage map, wherein the preheating coverage map represents a second correspondence between the domain name, a second IP address of an edge node to be preheated, and a first IP address of a client connected to the edge node to be preheated;

based on the preheating coverage map, preheating the resources under the domain name at the edge node to be preheated.

In some embodiments, if the content delivery network includes a superior cache node connected to the edge node to be preheated, the preheating coverage map is further configured to represent a third correspondence between the domain name, a third IP address of the superior cache node connected to the edge node to be preheated, and the first IP address of the client connected to the edge node to be preheated;

The preheating the resources under the domain name at the edge node to be preheated, comprises:

based on the preheating coverage map, preheating the resources under the domain name at the superior cache node connected to the edge node to be preheated.

By establishing a preheating coverage map, it is suitable for batch preheating of edge nodes to be preheated in a preheating area, with high efficiency. To put it simply, when sending access requests to the first edge nodes, respectively based on the second IP addresses in the first correspondence after completion of the de-duplication operation, if first edge nodes that have not cached the resources of the domain name are found, it is not necessary to preheat the resources immediately, but the first edge nodes that failed to preheat these resources can be recorded by a preheating coverage map, and after all the access requests are sent to all the first edge nodes, the first edge nodes that failed to preheat the resources are uniformly preheated based on the preheating coverage map, which is more efficient.

In the solution mentioned above, the second IP address of each first edge node is obtained based on the first IP address of the client in the preheating area, and the preheating result of each first edge node is checked. However, in some cases, there may be special circumstances that the first IP address of the client cannot be obtained. Embodiments in this special circumstance is described below.

In some embodiments, if the first IP address of the client in the preheating area is not obtained, a request can be sent to network equipment in the preheating area, so that the network equipment can send a resource access request to access the resources under the domain name, and then according to the resource access response received by the network equipment, determine whether the second edge node connected thereto has cached the resources under the domain name when the network equipment accesses the resources under the domain name.

In particular, the management platform can be communicatively connected to the network equipment. The network equipment can send resource access requests based on domain names (that is, the conventional manner for clients to access resources). Similar to the principle of the above access request, the resource access request can request to access the resources that have not been accessed under the domain name. In this way, resources are prevented from being cached to the edge nodes by resource returning.

The resource access response received by the network equipment can be similar to the following:

<X-Cache: TCP_MISS from a23-200-24-95.deploy.akamaitechnologies.com (AkamaiGHost/11.1.0-48603064) (-)

<X-Cache-Remote: TCP_MISS from a23-50-232-195.deploy.akamaitechnologies.com (AkamaiGHost/11.1.0-48603064) (-)

Similar to the related description in step S22 above, based on the resource access response, it can be determined whether a fourth IP address of the second edge node connected to the network equipment, a fifth IP address of the superior cache node connected by the second edge node, and the superior cache node connected to the second edge node, hit the accessed resources. For example, in the above resource access response, the fourth IP address of the second edge node connected to the network equipment is 23.200.24.95, the third IP address of the superior cache node connected to the second edge node is 23.50.232.195, and neither the second edge node nor the superior cache node connected to the second edge node hits the resources under the domain name. In this case, it can be considered that 23.200.24.95, the second edge node, failed in preheating the resources under the domain name and needs to preheat the resources again, that is, if it is determined that the resources under the domain name are not cached by the edge node of the content delivery network according to the resource access response received by the network equipment, the resources under the domain name are preheated at the second edge node based on the fourth IP address; or based on the fifth IP address, the superior cache node connected to the second edge node preheats the resources under the domain name.

As so, when the first IP address of the client in the preheating area is not obtained, the resource preheating of each edge node can still be checked, so that the solution has a higher reliability.

Figure 3:
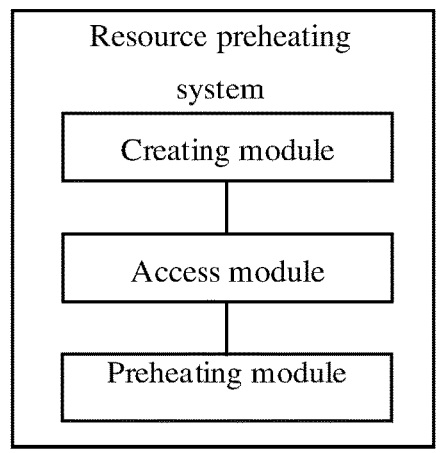
FIG. 3 shows a modular schematic diagram of a resource preheating system provided by embodiments of the present disclosure.

Referring now to FIG. 3, there is shown a modular schematic diagram of a resource preheating system provided by embodiments of the present disclosure. The resource preheating system comprises:

a creating module configured for creating an IP acquisition request based on a domain name that needs resource preheating and a first IP address of a client in a preheating area, so as to acquire a second IP address of a first edge node that the client needs to connect;

an access module configured for, according to the second IP address, sending an access request to the first edge node to determine whether the first edge node has cached resources under the domain name;

a preheating module configured for, if the first edge node has not cached the resources under the domain name, preheating the resources under the domain name at the first edge node.

In some embodiments, the creating module is configured particularly for:

obtaining first IP addresses of clients in different IP network segments in the preheating area; and creating an IP acquisition request based on the domain name and the first IP address of each client, so as to acquire a second IP address of the first edge node that each client needs to connect.

In some embodiments, the creating module is configured particularly for:

obtaining the first IP address of one of the clients in each IP network segment in the preheating area.

In some embodiments, the first IP address of the client and the second IP address of the first edge node to which the client needs to connect form a first correspondence; the sending an access request to the first edge node according to the second IP address, comprises:

performing a de-duplication operation to the first correspondence;

sending the access request to each of the first edge nodes based on the second IP address in the first correspondence after completion of the de-duplication operation, so as to determine whether each of the first edge nodes has cached the resources under the domain name.

In some embodiments, the access module is configured particularly for performing at least one of the following operations:

in response that there is a plurality of first IP addresses corresponding to a single second IP address, among the plurality of first IP addresses, retaining the correspondence of one of the first IP addresses to the second IP address, and deleting the correspondence of the other first IP addresses to the second IP address; or in response that there are multiple second IP addresses in a single IP network segment, among the multiple second IP addresses, retaining the correspondence of one of the second IP addresses to the first IP address, and deleting the correspondence of the other second IP addresses to the first IP address.

In some embodiments, the preheating module is configured particularly for:

for any one of the first edge nodes, in response that this first edge node has not cached the resources under the domain name, taking this first edge node as an edge node to be preheated;

establishing a preheating coverage map, wherein the preheating coverage map represents a second correspondence between the domain name, a second IP address of the edge node to be preheated, and a first IP address of a client connected to the edge node to be preheated; and based on the preheating coverage map, preheating the resources under the domain name at the edge node to be preheated.

In some embodiments, the content delivery network further includes a superior cache node connected to the edge node to be preheated, and the preheating coverage map is further configured to represent a third correspondence between the domain name, a third IP address of the superior cache node connected to the edge node to be preheated, and the first IP address of the client connected to the edge node to be preheated; the preheating module is configured particularly for:

based on the preheating coverage map, preheating the resources under the domain name at the superior cache node connected to the edge node to be preheated.

In some embodiments, the content delivery network further comprises a superior cache node connected to the first edge node; the access module is configured particularly for:

sending an access request to the first edge node based on specified resources under the domain name that have not been obtained from the first edge node; and in response that neither the first edge node nor the superior cache node connected to the first edge node has the specified resources, determining that the first edge node has not cached the specified resources.

In some embodiments, in response that the first IP address of the client in the preheating area is not obtained, the method further comprises:

sending a request to the network equipment in the preheating area, so that the network equipment sends a resource access request to access the resources under the domain name; and according to the resource access response received by the network equipment, determining whether the second edge node connected thereto has cached the resources under the domain name when the network equipment accesses the resources under the domain name.

In some embodiments, the resource access response further includes a fourth IP address of the second edge node, and a fifth IP address of the superior cache node connected to the second edge node;

in a case that it is determined according to the resource access response received by the network equipment that the second edge node has not cached the resources under the domain name, preheating the resources under the domain name at the second edge node based on the fourth IP address;

or preheating the resources under the domain name at the superior cache node connected to the second edge node based on the fifth IP address.

Figure 4:
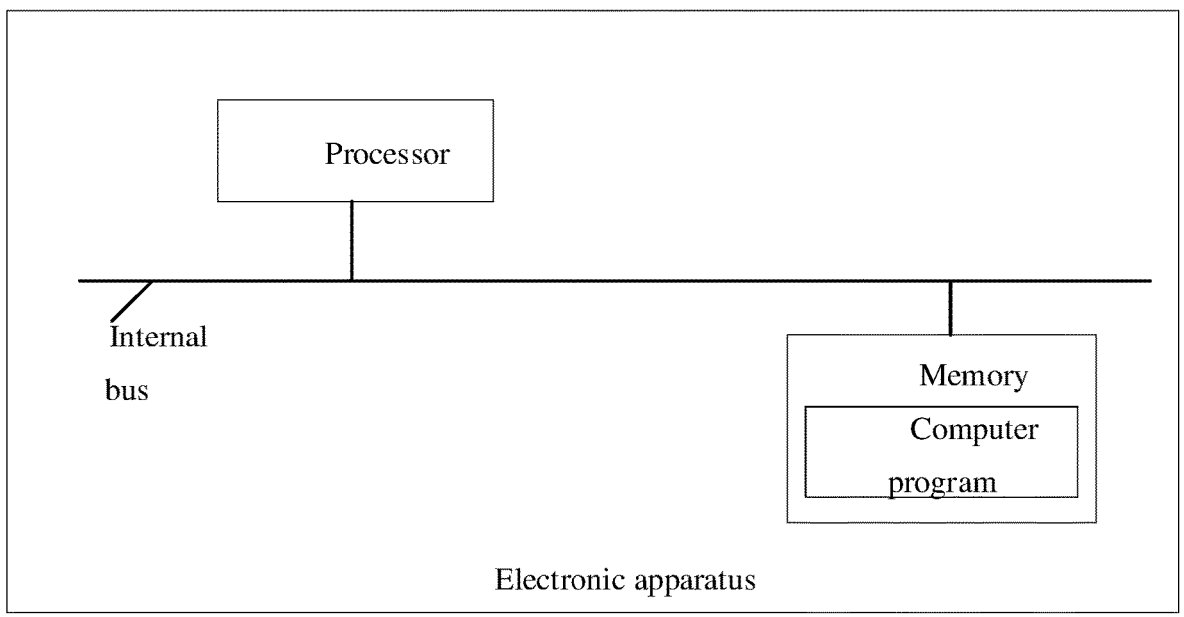
FIG. 4 shows a schematic diagram of an electronic apparatus provided by embodiments of the present disclosure.

Referring now to FIG. 4, there is shown a schematic diagram of an electronic apparatus provided by embodiments of the present disclosure. The electronic apparatus comprises a processor and a memory configured for storing a computer program, which when executed by the processor, implements said method as mentioned above.

Wherein, the processor can be a Central Processing Unit (CPU). The processor can also be any other general processor, a Digital Signal Processor (DSP), an Application specific integrated circuits (ASIC), a Field-Programmable Gate Array (FPGA) or any other chip as a programmable logic device, a discrete gate or transistor logic device, a discrete hardware component, etc., or a combination of the above-mentioned chips.

As a non-transitory computer-readable storage medium, the memory is configured to store non-transitory software programs, non-transitory computer-executable programs and modules, such as program instructions/modules corresponding to the method in the embodiment of the present disclosure. The processor executes various functional applications and data processing of the processor by running non-transitory software programs, instructions and modules stored in the memory, so as to implement the method in the embodiment of the above-mentioned method.

The memory can comprise a storage program area and a storage data area, wherein the storage program area is configured to store an operating system, applications needed by at least one function; the storage data area is configured to store data created by the processor, etc. Besides, the memory can comprises a high-speed random access memory, and can further comprise a non-transitory memory, such as at least one disk memory device, flash memory device, or any other non-transitory solid-state memory device. In some embodiments, the memory may optionally include memories remotely located with respect to the processor, and these remote memories may be connected to the processor through networks. Examples of the above-mentioned networks include, but are not limited to, the Internet, an intranet, a local area network, a mobile communication network, and combinations thereof.

One embodiment of the present disclosure further provides a computer-readable storage medium configured for storing a computer program, which when executed by a processor, implements the method as mentioned above.

Although the embodiments of the present disclosure have been described with reference to the drawings, various modifications and variations can be made by those skilled in the art without departing from the spirit and scope of the present disclosure, and such modifications and variations all fall within the scope defined by the appended claims.

What is claimed is:

1. A resource preheating method based on a content delivery network, wherein the content delivery network comprises a plurality of edge nodes for resource caching; the method comprises:
    creating an IP acquisition request based on a domain name that requires resource preheating and a first IP address of each client in a preheating area and acquiring a second IP address of each corresponding first edge node that each client needs to connect to, wherein the first IP address of each client and the second IP address of each corresponding first edge node to which each client needs to connect form a first correspondence;
    sending an access request to each corresponding first edge node according to the second IP address to determine whether the corresponding first edge node has cached resources under the domain name, wherein the sending an access request to each corresponding first edge node according to the second IP address comprises:
    performing a de-duplication operation to the first correspondence,
    sending the access request to each corresponding first edge node based on the second IP address in the first correspondence after completion of the de-duplication operation, and determining whether each corresponding first edge node has cached the resources under the domain name; and
    in response that the corresponding first edge node has not cached the resources under the domain name, preheating the resources under the domain name at the corresponding first edge node.

2. The method according to claim 1, wherein the creating an IP acquisition request based on a domain name that needs resource preheating and a first IP address of each client in a preheating area comprises:
    obtaining first IP addresses of clients in different IP network segments in the preheating area; and
    creating the IP acquisition request based on the domain name and the first IP address of each client and acquiring the second IP address of each corresponding first edge node that each client needs to connect.

3. The method according to claim 2, wherein, the obtaining first IP addresses of clients in different IP network segments in the preheating area, comprises:
    obtaining the first IP address of one of the clients in each IP network segment in the preheating area.

4. The method according to claim 1, wherein, the performing a de-duplication operation to the first correspondence, comprises at least one of the following operations:
    in response that there is a plurality of first IP addresses corresponding to a single second IP address, among the plurality of first IP addresses, retaining the correspondence of one of the first IP addresses to the second IP address, and deleting the correspondence of the other first IP addresses to the second IP address; or
    in response that there are multiple second IP addresses in a single IP network segment, among the multiple second IP addresses, retaining the correspondence of one of the second IP addresses to the first IP address, and deleting the correspondence of the other second IP addresses to the first IP address.

5. The method according to claim 1, wherein the preheating the resources under the domain name at the corresponding first edge node comprises:
    for each corresponding first edge node, in response that this first edge node has not cached the resources under the domain name, taking this first edge node as an edge node to be preheated;
    establishing a preheating coverage map, wherein the preheating coverage map represents a second correspondence between the domain name, a second IP address of the edge node to be preheated, and a first IP address of a client connected to the edge node to be preheated; and
    based on the preheating coverage map, preheating the resources under the domain name at the edge node to be preheated.

6. The method according to claim 5, wherein, the content delivery network further comprises a superior cache node connected to the edge node to be preheated, and the preheating coverage map is further configured to represent a third correspondence between the domain name, a third IP address of the superior cache node connected to the edge node to be preheated, and the first IP address of the client connected to the edge node to be preheated; the preheating the resources under the domain name at the edge node to be preheated, comprises:
    based on the preheating coverage map, preheating the resources under the domain name at the superior cache node connected to the edge node to be preheated.

7. The method according to claim 1, wherein, the content delivery network further comprises a superior cache node connected to each corresponding first edge node; the sending an access request to each corresponding first edge node to determine whether the corresponding first edge node has cached the resources under the domain name, comprises:

sending an access request to each corresponding first edge node based on specified resources under the domain name that have not been obtained from the corresponding first edge node; and in response that neither the corresponding first edge node nor the superior cache node connected to the corresponding first edge node has the specified resources, determining that the corresponding first edge node has not cached the specified resources.

8. The method according to claim 1, wherein, in response that the first IP address of the client in the preheating area is not obtained, the method further comprises:

sending a request to a network equipment in the preheating area, so that the network equipment sends a resource access request to access the resources under the domain name; and according to the resource access response received by the network equipment, determining whether a second edge node connected thereto has cached the resources under the domain name when the network equipment accesses the resources under the domain name.

9. The method according to claim 8, wherein, the resource access response further comprises a fourth IP address of the second edge node, and a fifth IP address of the superior cache node connected to the second edge node;

in a case that it is determined according to the resource access response received by the network equipment that the second edge node has not cached the resources under the domain name, preheating the resources under the domain name at the second edge node based on the fourth IP address; or preheating the resources under the domain name at the superior cache node connected to the second edge node based on the fifth IP address.

10. A non-transitory computer-readable storage medium having a computer program stored thereon, wherein the computer program when executed by a processor causes the processor to implement operations comprising:

creating an IP acquisition request based on a domain name that requires resource preheating and a first IP address of each client in a preheating area and acquiring a second IP address of each corresponding first edge node that each client needs to connect to, wherein the first IP address of each client and the second IP address of each corresponding first edge node to which each client needs to connect form a first correspondence;

sending an access request to each corresponding first edge node according to the second IP address to determine whether the corresponding first edge node has cached resources under the domain name, wherein the sending an access request to each corresponding first edge node according to the second IP address comprises:

performing a de-duplication operation to the first correspondence, sending the access request to each corresponding first edge node based on the second IP address in the first correspondence after completion of the de-duplication operation, and determining whether each corresponding first edge node has cached the resources under the domain name; and in response that the corresponding first edge node has not cached the resources under the domain name, preheating the resources under the domain name at the corresponding first edge node.

11. The non-transitory computer-readable storage medium according to claim 10, wherein the creating an IP acquisition request based on a domain name that needs resource preheating and a first IP address of each client in a preheating area comprises:

obtaining first IP addresses of clients in different IP network segments in the preheating area; and creating the IP acquisition request based on the domain name and the first IP address of each client and acquiring the second IP address of each corresponding first edge node that each client needs to connect.

12. The non-transitory computer-readable storage medium according to claim 11, wherein, the obtaining first IP addresses of clients in different IP network segments in the preheating area, comprises:

obtaining the first IP address of one of the clients in each IP network segment in the preheating area.

13. The non-transitory computer-readable storage medium according to claim 10, wherein, the performing a de-duplication operation to the first correspondence, comprises at least one of the following operations:

in response that there is a plurality of first IP addresses corresponding to a single second IP address, among the plurality of first IP addresses, retaining the correspondence of one of the first IP addresses to the second IP address, and deleting the correspondence of the other first IP addresses to the second IP address; or in response that there are multiple second IP addresses in a single IP network segment, among the multiple second IP addresses, retaining the correspondence of one of the second IP addresses to the first IP address, and deleting the correspondence of the other second IP addresses to the first IP address.

14. An electronic apparatus, comprising: a processor and a memory configured for storing a computer program, wherein the computer program when executed by the processor causes the processor to implement operations comprising:

creating an IP acquisition request based on a domain name that requires resource preheating and a first IP address of each client in a preheating area and acquiring a second IP address of each corresponding first edge node that each client needs to connect to, wherein the first IP address of each client and the second IP address of each corresponding first edge node to which each client needs to connect form a first correspondence;

sending an access request to each corresponding first edge node according to the second IP address to determine whether the corresponding first edge node has cached resources under the domain name, wherein the sending an access request to each corresponding first edge node according to the second IP address comprises:

performing a de-duplication operation to the first correspondence, sending the access request to each corresponding first edge node based on the second IP address in the first correspondence after completion of the de-duplication operation, and determining whether each corresponding first edge node has cached the resources under the domain name; and in response that the corresponding first edge node has not cached the resources under the domain name, preheating the resources under the domain name at the corresponding first edge node.

15. The electronic apparatus according to claim 14, wherein the creating an IP acquisition request based on a domain name that needs resource preheating and a first IP address of each client in a preheating area comprises:

obtaining first IP addresses of clients in different IP network segments in the preheating area; and creating the IP acquisition request based on the domain name and the first IP address of each client and acquiring the second IP address of each corresponding first edge node that each client needs to connect.

16. The electronic apparatus according to claim 15, wherein, the obtaining first IP addresses of clients in different IP network segments in the preheating area, comprises:

obtaining the first IP address of one of the clients in each IP network segment in the preheating area.

17. The electronic apparatus according to claim 14, wherein, the performing a de-duplication operation to the first correspondence, comprises at least one of the following operations:

in response that there is a plurality of first IP addresses corresponding to a single second IP address, among the plurality of first IP addresses, retaining the correspondence of one of the first IP addresses to the second IP address, and deleting the correspondence of the other first IP addresses to the second IP address; or in response that there are multiple second IP addresses in a single IP network segment, among the multiple second IP addresses, retaining the correspondence of one of the second IP addresses to the first IP address, and deleting the correspondence of the other second IP addresses to the first IP address.

* * * * *